United States Patent [19]

Erickson

[11] Patent Number: 4,726,268
[45] Date of Patent: Feb. 23, 1988

[54] CLAMPING APPARATUS FOR HOLDING A TOOLHOLDER SHANK

[75] Inventor: Robert A. Erickson, Raleigh, N.C.

[73] Assignees: Kennametal Inc., Latrobe, Pa.; Krupp Widia GmbH, Essen, Fed. Rep. of Germany

[21] Appl. No.: 7,310

[22] Filed: Jan. 27, 1987

[51] Int. Cl.[4] .............................................. B23B 29/00
[52] U.S. Cl. .................................. 82/36 B; 403/322; 403/374; 409/234
[58] Field of Search ................ 82/36 B, 36 R, 36 A; 409/232–234; 279/1 B; 403/322, 324, 374; 408/238, 239 R, 239 A

[56] References Cited

U.S. PATENT DOCUMENTS

| | | | |
|---|---|---|---|
| 1,119,528 | 12/1914 | Nieman . | |
| 2,970,844 | 2/1961 | Better | 279/75 |
| 2,990,188 | 6/1961 | Better et al. | 279/75 |
| 3,115,798 | 12/1963 | Donaway | 82/34 |
| 3,498,653 | 3/1970 | McCreery et al. | 287/119 |
| 3,851,562 | 12/1974 | Tomita et al. | 20/11 A |
| 3,874,824 | 4/1975 | Cronstedt et al. | 417/406 |
| 4,018,112 | 4/1977 | Heaton et al. | 82/1 C |
| 4,068,559 | 1/1978 | Schmid et al. | 90/11 D |
| 4,099,889 | 7/1978 | Vig | 408/239 R |
| 4,122,755 | 10/1978 | Johnson et al. | 90/11 A |
| 4,131,054 | 12/1978 | Johnson et al. | 90/11 |
| 4,135,418 | 1/1979 | McCray et al. | 82/36 A |
| 4,197,771 | 4/1980 | Heaton et al. | 82/36 B |
| 4,228,705 | 10/1980 | Heisner | 82/36 |
| 4,270,422 | 6/1981 | Andersson | 82/36 R |
| 4,292,866 | 10/1981 | Kaczynski | 82/36 R |
| 4,350,463 | 9/1982 | Friedline | 409/234 |
| 4,406,195 | 9/1983 | Kruger et al. | 82/36 |
| 4,573,824 | 3/1986 | Ehle | 403/322 |
| 4,575,293 | 3/1986 | Berti | 409/234 |
| 4,604,012 | 8/1986 | Kawasaki et al. | 409/233 |
| 4,615,244 | 10/1986 | Reiter et al. | 82/36 R X |

FOREIGN PATENT DOCUMENTS

| | | |
|---|---|---|
| 0061075 | 9/1982 | European Pat. Off. . |
| 0123156 | 10/1984 | European Pat. Off. . |
| 1333872 | 10/1973 | United Kingdom . |
| 1456611 | 11/1976 | United Kingdom . |
| 2154479 | 9/1985 | United Kingdom . |

Primary Examiner—Gil Weidenfeld
Assistant Examiner—Steven C. Bishop
Attorney, Agent, or Firm—John J. Prizzi

[57] ABSTRACT

An apparatus for holding a tubular shank of a toolholder is provided with a tool support member bore for receiving the shank and first and second radially reciprocal movable clamping jaws for holding the shank in the bore. The movement of the clamping jaws is radially activated by rotation of a radially aligned differentially threaded member engaging both clamping jaws.

8 Claims, 5 Drawing Figures

CLAMPING APPARATUS FOR HOLDING A TOOLHOLDER SHANK

BACKGROUND OF THE INVENTION

The present invention relates to mechanisms for releasably holding a first member and a second member together along a longitudinal axis. It is especially concerned with mechanisms for releasably holding a toolholder shank in a support member bore when the mechanism actuating member is transversely aligned with respect to the longitudinal axis of the toolholder shank and support member bore. Such mechanisms and articles are used in the cutting and shaping of workpieces where it is not expedient to use the tool support member in connection with a base member having a bore containing an axially aligned power driven means for axially actuating the locking mechanism in the tool support member.

Examples of toolholders and support members utilizing releasable locking mechanisms having radial activation are shown in U.S. Pat. Nos. 4,573,824; 4,575,293 and 4,135,418.

There is, however, always a need for improved mechanisms in this field. The ideal mechanism should hold the toolholder securely in place and not detract from the basic stiffness of the toolholder. It should be relatively simple in design so as to be manufactured at a relatively low cost.

SUMMARY OF THE INVENTION

It is believed that the following design meets the foregoing needs. In accordance with the present invention, an apparatus is provided for releasably holding the tubular shank of a toolholder. The apparatus includes a tool support member having a forwardly facing surface and a bore extending rearwardly therefrom for receiving a tubular shank. Mounted in the tool support member are first and second clamping jaws which extend at least partially into the tool support member bore. An actuating member is provided for reciprocating the jaws radially inwardly so that they be at least partially received with a tubular shank and then radially outwardly for releasably clamping the tubular shank to the tool support member.

The actuating member for reciprocating the clamping jaws is preferably a threaded member radially extending into the clamping jaws. More preferably, the threaded member is threadedly engaged in both clamping jaws. Most preferably, the threaded member includes a first threaded diameter threaded in a first direction at a first pitch threadedly engaged in the first clamping jaw, and a second different threaded diameter threaded in the first direction but at a second pitch threadedly engaged in the second clamping jaw.

It is also preferred that at least one, and more preferably both clamping jaws, have a surface thereon for abutting against the toolholder shank, when they are reciprocated radially inwardly to unclamp the toolholder, to push the toolholder shank forwardly in the tool support member bore. In this manner, when a self-sticking taper is provided on the toolholder shank and tool support member bore, removal of the shank from the bore is facilitated.

BRIEF DESCRIPTION OF THE DRAWINGS

The foregoing and other aspects of the present invention will become more apparent upon review of the following detailed description of the invention in conjunction with the drawings which are briefly described below.

DETAILED DESCRIPTION OF THE INVENTION

Figure 1:
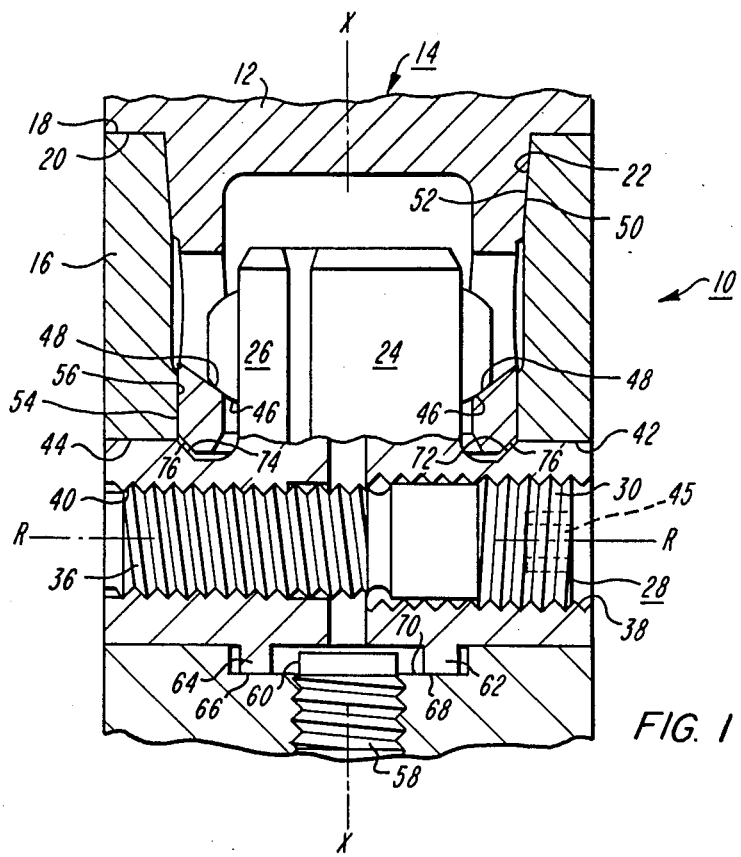
FIG. 1 shows a side view of an embodiment of a clamping apparatus in accordance with the present invention in partial cross section holding a tubular shank of a toolholder.
Figure 2:
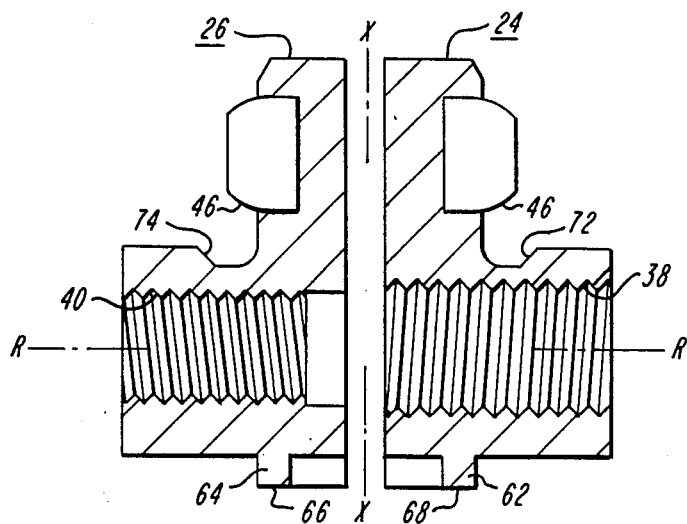
FIG. 2 shows a cross cross sectional view of the embodiments of the first and second clamping jaws in accordance with the present invention shown in FIG. 1 taken along the plane defined by orthogonal axes X—X and R—R.
Figure 3:
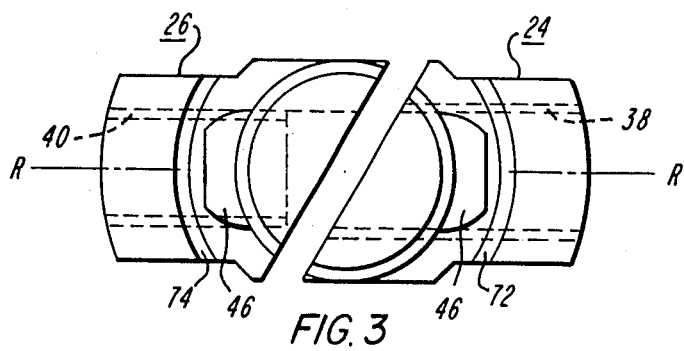
FIG. 3 shows a plan view of the embodiment of the first and second clamping jaws shown in FIG. 1 as viewed looking rearwardly from the forward end of the apparatus shown in FIG. 1 along axis X—X.
Figure 4:
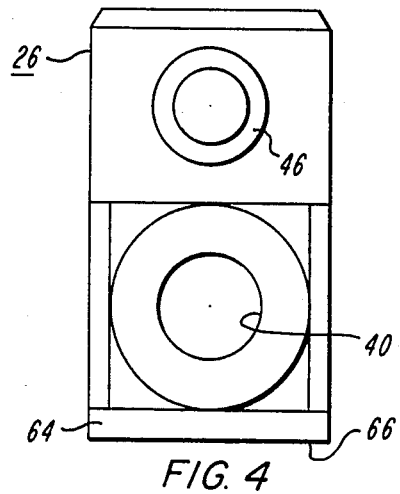
FIG. 4 shows a plan view of the embodiment of the second clamping jaw shown in FIG. 1 as seen looking radially inwardly along axis R—R.
Figure 5:
FIG. 5 shows a plan view of the embodiments of the clamping jaws shown in FIG. 1 as viewed looking forwardly from the rear end of the apparatus shown in FIG. 1 along axis X—X.

In accordance with the present invention, FIG. 1 shows an embodiment of an apparatus 10 for releasably holding the tubular shank 12 of a toolholder 14. The apparatus 10 includes a tool support member 16 having a forwardly facing surface 18 which may be used for abutting against a rearwardly facing face 20 of the toolholder 14. Intersecting the forwardly facing surface 18 is a bore 22 which extends rearwardly therefrom about a longitudinal axis of symmetry X—X. Located within the tool support member 16 are first 24 and second 26 clamping jaws which are also shown in FIGS. 2 through 5.

The first and second clamping jaws, 24 and 26, are reciprocally movable along radial axis R—R due to their threaded engagement with threaded member 28 which extends along axis R—R. The threaded member 28 includes a first threaded portion 30 having a first threaded diameter threaded in a first direction at a first pitch and a second threaded portion 36 having a second threaded diameter also threaded in the first direction but at a second pitch. The first threaded portion 30 is threadedly engaged in a threaded radial bore 38 in the first clamping element 24 while the second threaded portion 36 is threadedly engaged in the threaded radial bore 40 of the second clamping jaw 26. The diameter of the second threaded portion 36 is smaller than the diameter of first threaded portion 30 in an amount sufficient to allow it to readily pass through the threaded bore 38 of the first clamping jaw 24 without engaging those threads. By way of example, it has been preferred to have the first threaded portion 30 have a ⅜ inch diameter 24 threads/inch left handed thread while the second threaded portion has a 5/16 inch diameter 18 threads/inch left handed thread.

Alternatively, the threaded member may have first and second threaded portions which are threaded in the opposite direction to each other for reciprocating the clamping jaws. This embodiment, while resulting in a workable apparatus, is not as preferred as the embodiment shown utilizing threaded member 28 for the reasons that threaded member 28 provides a higher mechanical advantage and results in easier assembly of the jaws. The embodiment shown in FIG. 1 is readily assembled by first inserting one clamping jaw in through the forward end of the bore and then holding it radially outwardly in one of the cylindrical radial openings 44 or 42 of the tool support member while the other clamping jaw is slipped in through the forward end of the bore and into the other cylindrical radial opening. The threaded member is thus threadedly engaged into the two aligned clamping jaws 24 and 26.

It can now clearly be seen that by rotating the threaded member, such as with an Allen Key wrench engaged in the hexagonal cross section recess in the first threaded portion, in a first direction the clamping jaws which are slidably engaged in radial cylindrical apertures 42 and 44 in the support member travel radially outwardly to clamp the tubular shank 12 into the bore of the support member, as shown. Here each clamping jaw is provided with a convex spherical abutment surface 46 for abutment with a concave cylindrical abutment face 48 that inclines forwardly as it extends radially outwardly in the shank which has a radius of curvature equal to but no more than 0.004, and preferably 0.002, inches greater than the radius of curvature of the convex spherical abutment surfaces. The spherical abutment surfaces are located on abutment members which are press fit into cylindrical depressions in the clamping jaws.

In the foregoing manner: (1) the conically tapered forward surface 50 of the shank is pushed rearwardly into an interference fit with a complementary tapered surface 52 on the bore 22; while (2) rearwardly facing abutment face 20 on the toolholder is brought into abutment with the forwardly facing surface 18 on the tool support member; and (3) rear convex cylindrical surface 54 on the shank is expanded into abutment with a complementary concave cylindrical surface 56 in the bore.

By rotating the threaded member 28 in a second direction, clamping jaws 24 and 26 converge inwardly toward one another to release the tubular shank. A set screw 58 centrally mounted along axis X—X in the bottom of the bore rearwardly of the clamping jaws provides an annular abutment surface 60 for abutment with either flange 62 and/or 64 on the first and second clamping jaws, respectively, to assure that when the clamping jaws are moved radially inwardly they are sufficiently centered in the bore to avoid interference with the removal of the shank and the entry of a new shank. Flanges 62 and 64 have flat bottom surfaces 66 and 68 which engage and slide across an annular flat forward facing surface 70 in the bore to thereby hold the clamping jaws nonrotatable.

As the clamping jaws are moved radially inwardly, a forwardly facing arcuate surface 72 and 74, which inclines radially outwardly as it extends forwardly, on at least one, and preferably both, of the clamping jaws engages a rearwardly tapering surface 76 on the rear of the shank 76 to force the shank forwardly in the bore. This feature is especially valuable where the shank and bore have conical mating surfaces which provide a self-sticking taper.

A preferred toolholder design for use with the present invention is disclosed in concurrently filed copending Erickson et al U.S. patent application Ser. No. 007,070. This application is hereby incorporated by reference in its entirety.

Changes and modifications in the specifically described embodiments can be carried out without departing from the scope of the invention which is intended to be limited only by the scope of the appended claims.

What is claimed is:

1. An apparatus for releasably holding the tubular shank of a toolholder, said apparatus comprising:
    a tool support member having a forwardly facing surface and bore intersecting said forwardly facing surface and extending rearwardly therefrom for receiving said shank;
    a first clamping jaw and a second clamping jaw mounted in said tool support member and extending at least partially into said bore;
    a means for reciprocating said first and said second clamping jaws radially inwardly for being receivable at least partially within said tubular shank and radially outwardly for clamping said tubular shank to said tool support member;
    said means for receiprocating including a threaded member radially extending into said first and said second clamping jaws for reciprocating said first and second clamping jaws;
    and said threaded member including a first threaded diameter threaded in a first direction at a first pitch and threadably engaged in said first clamping jaw, and a second threaded diameter threaded in said first direction at a second pitch and threadedly engaged in said second clamping jaw.

2. An apparatus for releasably holding the tubular shank of a toolholder, said apparatus comprising;
    a tool support member having a forwardly facing surface and bore intersecting said forwardly facing surface and extending rearwardly therefrom for receiving said shank;
    a first clamping jaw and a second clamping jaw mounted in said tool support member and extending at least partially into said bore;
    a means for reciprocating said first and said second clamping jaws radially inwardly for being receivable at least partially within said tubular shank and radially outwardly for clamping said tubular shank to said tool support member;
    said means for reciprocating including a threaded member radially extending into said first and said second clamping jaws for reciprocating said first and second clamping jaws;
    and a means for pushing said tubular toolholder shank forwardly in said bore on at least one of said first and said second clamping jaws when said first and second clamping jaws are reciprocated radially inwardly to unclamp said tubular shank.

3. The apparatus according to claim 1 further comprising a means for pushing said tubular toolholder shank forwardly in said bore on at least one of said first and said second clamping jaws when said first and second clamping jaws are reciprocated radially inwardly to unclamp said tubular shank.

4. The apparatus according to claim 1 further comprising a first and a second spherical abutment surface on said first and second clamping jaws, respectively, for releasable abutment with said tubular shank when said first and second clamping jaws are reciprocated radially outwardly.

5. The apparatus according to claim 2 further comprising a first and a second spherical abutment surface on said first and second clamping jaws, respectively, for releasable abutment with said tubular shank when said first and second clamping jaws are reciprocated radially outwardly.

6. The apparatus according to claim 3 further comprising a first and a second spherical abutment surface on said first and second clamping jaws, respectively, for releasable abutment with said tubular shank when said first and second clamping jaws are reciprocated radially outwardly.

7. The apparatus according to claim 2 wherein said threaded member is threadedly engaged in said first and said second clamping jaws.

8. The apparatus according to claim 5 wherein said threaded member is threadedly engaged in said first and said second clamping jaws.

* * * * *